Dec. 29, 1925.

M. OPANCHYK

SHOCK ABSORBER

Filed Feb. 9, 1925

1,567,381

Inventor
MIKE OPANCHYK.

By
Attorney

Patented Dec. 29, 1925.

1,567,381

UNITED STATES PATENT OFFICE.

MIKE OPANCHYK, OF BIRMINGHAM, ALABAMA, ASSIGNOR OF THREE-FOURTHS TO SALLIE M. BRADLEY AND ONE-FOURTH TO T. M. BRADLEY, JR., BOTH OF BIRMINGHAM, ALABAMA.

SHOCK ABSORBER.

Application filed February 9, 1925. Serial No. 8,007.

*To all whom it may concern:*

Be it known that I, MIKE OPANCHYK, a citizen of the United States of America, residing at Birmingham, in the county of Jefferson and State of Alabama, have invented certain new and useful Improvements in Shock Absorbers, of which the following is a specification.

My invention relates to shock absorbers of the type utilizing an auxiliary spring made fast to one of the relatively movable elements of a vehicle, preferably to the running gear, and having flexible connections from the spring to the body.

More particularly my invention contemplates the provision of springs of the semi-elliptical type comprising oppositely curved upper and lower members connected at their center to the running gear and having a flexible connection woven about their free ends so that relative movement between body and running gear will induce an opposed movement of the reversely curved springs equal to half of the body.

More particularly my invention contemplates providing the free ends of the springs with antifriction rollers, there being preferably one roller on each end of the upper spring and two on each end of the lower spring, and over the upper roller and under the lower rollers at each end is passed an endless band which leads up and over a roller on the body. The springs are put under tension before the band is applied.

My invention further comprises the novel details of construction in the manner of mounting the springs on the front and rear axles of the running gear and of mounting the rollers on the springs.

My invention further comprises the novel details of construction and arrangements of parts, which in their preferred embodiment only are illustrated in the accompanying drawings which form a part of this specification, and in which:—

Similar reference numerals refer to similar parts throughout the drawings.

Figure 1:
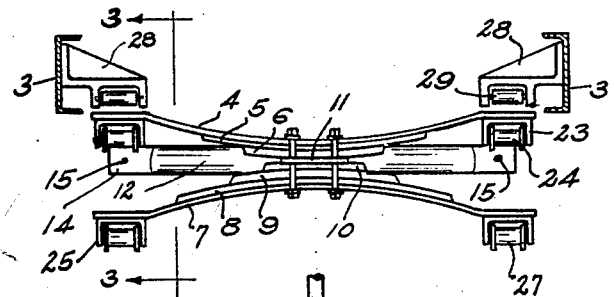
Fig. 1 is an elevation of the rear shock absorbing spring, omitting the flexible belts and all parts of the body and running gear except the side frame channels which are shown in cross section.
Figure 2:
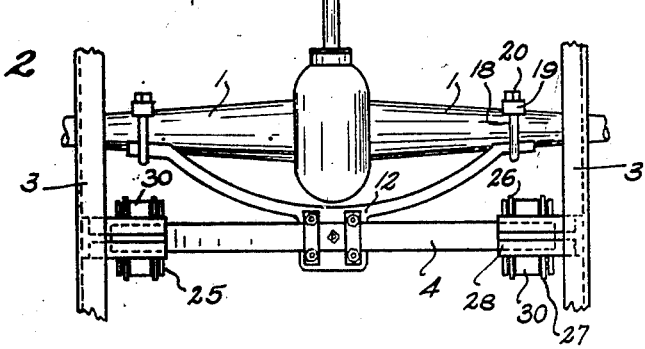
Fig. 2 is a plan view of Fig. 1, showing the manner of mounting the rear shock absorber on the rear axle, the connecting belts being shown.
Figure 3:
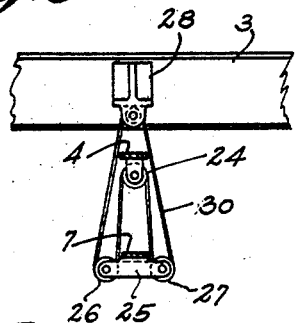
Fig. 3 is a cross-sectional view taken on the line 3—3 of Fig. 1.
Figure 4:
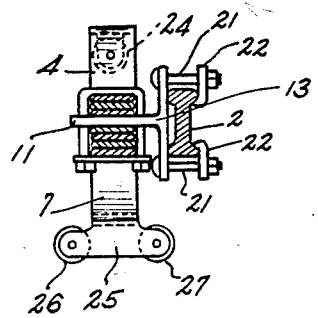
Fig. 4 is a cross-sectional view through the front axle showing the clip and mounting bracket for my improved spring shock absorber.
Figure 5:
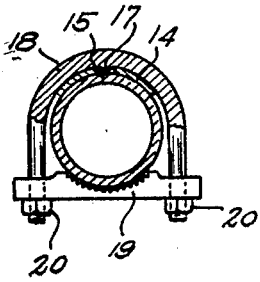
Fig. 5 is a cross-sectional view taken through the rear axle housing and showing the improved clamp for the rear spring bracket.

I have illustrated my invention in connection with conventional automobile parts which are typical of any vehicle and which as shown comprise the rear axle housing 1, the front axle 2, and the side channels 3 of the chassis. The shock absorber spring should be of the type comprising oppositely working elements and my invention, broadly speaking, contemplates any such type of spring. The preferred type of spring which alone is illustrated is of the semi-elliptical type comprising upper leaves 4, 5 and 6 disposed with their concave surfaces upward and a lower semi-elliptical spring comprising leaves 7, 8, 9 and 10 disposed with their concave faces downward. The adjacent or short leaves 6 and 10 of the two springs are mounted respectively above and below a bracket 11, which for the rear spring forms a part of the arched frame 12 and for the front spring forms a part of clamp plate 13. The frame 12 has its ends 14 curved in transverse cross section to conform to the curvature of the rear axle housing 1 at a point where the frame ends will engage such housing, and I provide in each end of the frame a hole 15 adapted to receive a boss or projection 17 on a U-shaped clamp 18, which clamp is adapted to pass about the axle housing and through a clamp plate 19 having a serrated or toothed concave face adapted to engage the housing 1 and be clamped so firmly against it by nuts 20 on the U-bolt so that the frame 12 will be positively prevented from slippage relatively to the rear axle housing when once mounted thereon in proper operating position. The clamp plate 13 of the front axle is adapted to be clamped to such axle by bolts 21 and clips 22, as shown in Fig. 4, which will serve to hold the forward bracket in its desired operating position. The front and rear springs being alike the description of one applies to both, though obviously the strength and size of the springs may vary relatively as different conditions of use may make desirable.

The free ends of the upper leaves 4 have attached to their under face a U-shaped frame 23 in which a flanged roller 24 is journaled, and in like manner the free ends of the lower leaf 7 have a wide U-shaped frame 25 secured to the under-side thereof and carrying at their ends a pair of flanged rollers 26 and 27 which are offset beyond the side of the spring leaf 7. To the inner face of each channel 3, preferably in line with the roller 24, I mount a bracket 28 having journaled in underhung lugs a roller 29. An endless belt 30 of stout flexible material is passed over the roller 24 and the flights thereof and then passed under and outwardly about the rollers 25 and 27 and thence upwardly and over the roller 29. Having applied the belts in this manner to the four ends of all of the front and rear springs the action of the shock absorber is as follows. Relative movement between running gear and body induced by road inequalities leaves such vehicle parts free to approach each other, and the springs, which are placed under tension when assembling the belt, will expand to take up the slack in the belt. As the vehicle parts attempt a reverse or a rebound movement, the belts tighten and draw the two free ends of the springs together at each end with a thrust imposed thus directly upon the two springs, each however having movement equal to one half that of the body. This enables me within a limited space to arrange groups adapted to give an easy riding condition free of objectionable rebound.

Figure 6:
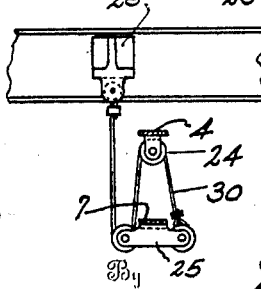
Fig. 6 illustrates a modified manner of attachment of a single belt to avoid obstacles and provide single tensioning adjustment.

Referring to Fig. 6 it may often occur that convenient space is not available immediately above the ends of the spring to receive the bracket for the upper roller and to permit the use of the endless belt. Under such conditions a single belt 30 can be employed by being fastened in any suitable manner about one of the lower rollers and woven over the upper spring roller and back under the lower spring roller and up to a suitable attaching bracket 31. This arrangement makes it possible to locate this latter bracket at any convenient point juxtaposed to the spring and on either side of the spring wherever most clearance is available.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. An auxiliary spring shock absorber comprising reversely acting springs, an endless flexible belt passed about said springs in position to have its motion in one direction jointly resisted by opposite movement of said springs, means to connect said belt to one part of the vehicle so that motion in said direction will be imparted to the belt on rebounds, and means to mount the springs on an element of the vehicle movable relatively to said first mentioned element.

2. A spring shock absorber according to claim 1, in which the springs are of the semi-elliptical leaf type comprising reversely disposed upper and lower members held under tension by said belt.

3. A spring shock absorber according to claim 1, in which the springs are of the semi-elliptical leaf type comprising reversely disposed upper and lower members, said members carrying underhung from their free ends guides for said flexible connection.

4. A spring shock absorber for vehicles, comprising upper and lower reversely disposed elliptical springs, means to connect said springs at their center to a vehicle running gear, rollers mounted on the free ends of said spring, a roller mounted on the vehicle body above each end of the spring, and an endless band passed about said rollers in position to hold the springs under tension and to compress both springs as the body rebounds.

5. A spring shock absorber as described in claim 4, in which the lower spring element carries two laterally off-set rollers and each belt passes over an upper spring roller and under the adjacent spring rollers.

6. A spring shock absorber comprising reversely acting springs having belt guides, means to mount said springs on one body element, of an upper belt guide and means to mount it on a relatively movable body element, and a free endless belt passed about said guides in position to bring both reversely acting springs into play to resist body rebound with a motion for each spring of approximately half that of the body.

7. In combination with a vehicle body and running gear, of a pair of belt guides on the body, a shock absorbing spring comprising reversely acting leaf springs having belt guides at their free ends, a belt passed through said guides, and a bracket to mount said spring on the rear axle, comprising an arched frame having its end shaped to conform to the rear axle housing, U-clamps interlocking with the frame ends and straddling the housing, and clamp plates bolted to the U-bolts and having concave toothed faces adapted to engage the housing and hold the frame rigidly in position thereon, substantially as described.

In testimony whereof I affix my signature.

MIKE OPANCHYK.